(12) United States Patent
Tsai et al.

(10) Patent No.: US 10,926,865 B2
(45) Date of Patent: Feb. 23, 2021

(54) SPOILER WITH RELEASABLE PORTION

(71) Applicant: THE BOEING COMPANY, Chicago, IL (US)

(72) Inventors: Kevin Tsai, Seattle, WA (US); Donald Drew Reinhart, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 303 days.

(21) Appl. No.: 16/216,769

(22) Filed: Dec. 11, 2018

(65) Prior Publication Data
US 2020/0180749 A1 Jun. 11, 2020

(51) Int. Cl.
| B64C 9/20 | (2006.01) |
| B64C 9/12 | (2006.01) |
| B64C 9/32 | (2006.01) |
| B64C 9/14 | (2006.01) |

(52) U.S. Cl.
CPC .......... *B64C 9/20* (2013.01); *B64C 9/12* (2013.01); *B64C 9/323* (2013.01); *B64C 2009/143* (2013.01)

(58) Field of Classification Search
CPC ....... B64C 9/20; B64C 2009/143; B64C 9/12; B64C 9/323; B64C 3/48; B64C 9/02; B64C 3/50
See application file for complete search history.

(56) References Cited

U.S. PATENT DOCUMENTS

| 4,293,110 | A | * | 10/1981 | Middleton | B64C 9/26 244/199.1 |
| 6,729,583 | B2 | * | 5/2004 | Milliere | B64C 9/323 244/213 |
| 7,243,881 | B2 | | 7/2007 | Sakuri et al. | |
| 7,338,018 | B2 | * | 3/2008 | Huynh | B64C 9/16 244/215 |
| 7,611,099 | B2 | * | 11/2009 | Kordel | B64C 7/00 244/215 |
| 8,556,214 | B2 | * | 10/2013 | McAlinden | B64C 7/00 244/130 |
| 8,844,879 | B2 | * | 9/2014 | Santini | B64C 3/48 244/219 |
| 9,580,168 | B2 | * | 2/2017 | Fevergeon | B64C 9/04 |
| 9,688,384 | B1 | | 6/2017 | Balzer et al. | |

(Continued)

FOREIGN PATENT DOCUMENTS

GB            GB1339081 A * 11/1973 ........... C07D 211/82

*Primary Examiner* — Tien Q Dinh
*Assistant Examiner* — Madison Elizabeth Dittner
(74) *Attorney, Agent, or Firm* — Moore IP Law

(57) ABSTRACT

A spoiler mechanism for an aircraft includes a spoiler fore-section and a spoiler aft-section. The spoiler fore-section includes a forward end configured to couple to a wing structure of an aircraft and a hinge end. The hinge end includes a first hinge coupling and a first retainer portion. The spoiler aft-section includes a second retainer portion and a second hinge coupling coupled to the first hinge coupling of the spoiler fore-section. The first retainer portion and the second retainer portion are configured to engage one another when the spoiler aft-section is aligned with the spoiler fore-section, and the first retainer portion and the second retainer portion are configured to disengage from one another responsive to the spoiler aft-section pivoting upward relative to the spoiler fore-section.

20 Claims, 7 Drawing Sheets

(56) References Cited

U.S. PATENT DOCUMENTS

| | | |
|---|---|---|
| 2007/0176051 A1 | 8/2007 | Good et al. |
| 2010/0320332 A1 | 12/2010 | Voss et al. |
| 2011/0061579 A1* | 3/2011 | Van Gelder ............ B63B 32/60 |
| | | 114/140 |
| 2012/0292452 A1 | 11/2012 | Parker |

* cited by examiner

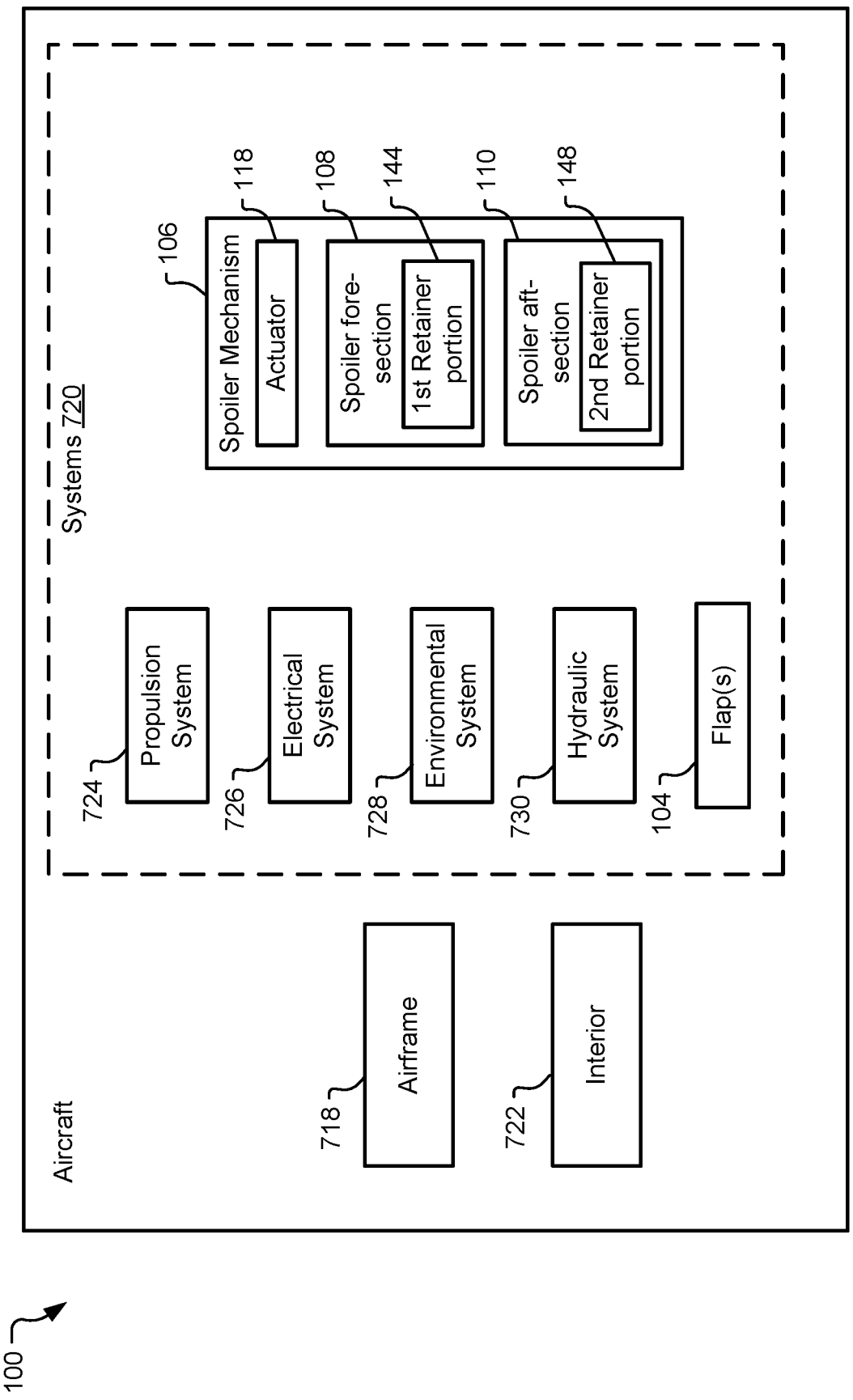

SPOILER WITH RELEASABLE PORTION

FIELD OF THE DISCLOSURE

The present disclosure is generally related to an aircraft spoiler with a releasable portion.

BACKGROUND

An aircraft spoiler is a device that includes a surface that can be extended upward into airflow over a wing or other airfoil to reduce lift. Many aircraft include spoilers that can be deployed in this manner during descent to increase a rate of descent of the aircraft without increasing the aircraft's speed. Spoilers are often also deployed upon landing to increase a downward force on the wing to assist with braking.

Although spoilers have traditionally been configured to be deployed upward in order to decrease lift, some aircraft have spoilers that are also configured to be deployable in a "droop" configuration. In such aircraft, when flaps of the aircraft are extended to increase lift, spoilers adjacent to the flaps can be deployed in a droop configuration (e.g., rotated downward toward the flaps) in order to improve airflow characteristics over the wing.

SUMMARY

In a particular implementation, a spoiler mechanism for an aircraft includes a spoiler fore-section and a spoiler aft-section. The spoiler fore-section includes a forward end configured to couple to a wing structure of an aircraft and includes a hinge end. The hinge end includes a first hinge coupling and a first retainer portion. The spoiler aft-section includes a second retainer portion and a second hinge coupling coupled to the first hinge coupling of the spoiler fore-section. The first retainer portion and the second retainer portion are configured to engage one another when the spoiler aft-section is aligned with the spoiler fore-section, and the first retainer portion and the second retainer portion are configured to disengage from one another responsive to the spoiler aft-section pivoting upward relative to the spoiler fore-section.

In another particular implementation, an aircraft includes a wing structure, a flap coupled to the wing structure, and a spoiler mechanism. The spoiler mechanism includes a spoiler fore-section and a spoiler aft-section. The spoiler fore-section includes a forward end coupled to the wing structure and includes a hinge end. The hinge end includes a first hinge coupling and a first retainer portion. The spoiler aft-section includes a second retainer portion and a second hinge coupling coupled to the first hinge coupling of the spoiler fore-section. The first retainer portion and the second retainer portion are configured to engage one another when the spoiler aft-section is aligned with the spoiler fore-section, and the first retainer portion and the second retainer portion are configured to disengage from one another responsive to the spoiler aft-section pivoting upward relative to the spoiler fore-section.

In another particular implementation, a method of controlling a spoiler of an aircraft includes extending a flap from a wing structure of the aircraft. The method also include deploying a spoiler mechanism from the wing structure in a droop configuration toward the flap. The spoiler mechanism includes a spoiler fore-section and a spoiler aft-section. The spoiler fore-section includes a forward end coupled to the wing structure and includes a hinge end. The hinge end includes a first hinge coupling and a first retainer portion. The spoiler aft-section includes a second retainer portion and a second hinge coupling coupled to the first hinge coupling of the spoiler fore-section. The first retainer portion and the second retainer portion are configured to engage one another when the spoiler aft-section is aligned with the spoiler fore-section, and the first retainer portion and the second retainer portion are configured to disengage from one another responsive to the spoiler aft-section pivoting relative to the spoiler fore-section. The method also includes after deploying the spoiler mechanism, retracting the flap and disengaging the first retainer portion and the second retainer portion responsive to a force applied by the flap to the spoiler aft-section.

BRIEF DESCRIPTION OF THE DRAWINGS

FIG. 7 is a block diagram of the aircraft and the spoiler mechanism of FIG. 1.

DETAILED DESCRIPTION

Figure 1:
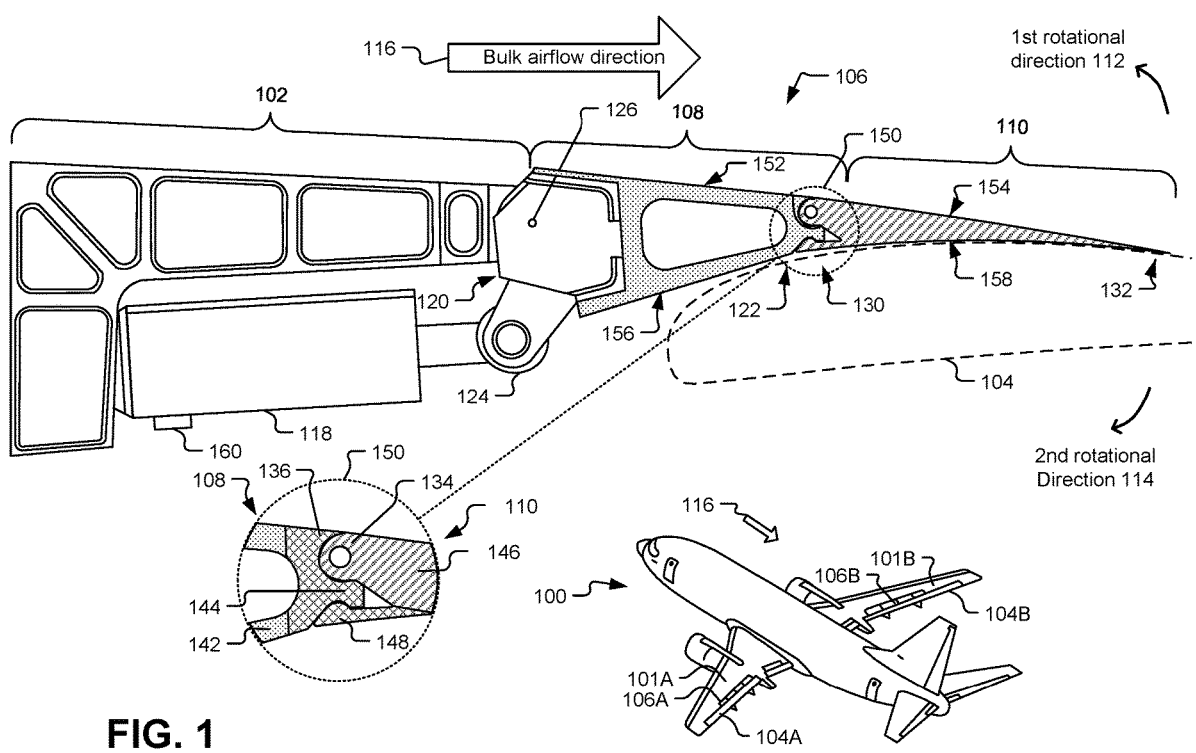
FIG. 1 is a diagram that illustrates an example of an aircraft and details of a spoiler mechanism according to a particular implementation.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, an aircraft 100 is illustrated and includes multiple flaps 104A and 104B. When referring to a particular one of these flaps, such as the flap 104A, the distinguishing letter "A" is used. However, when referring to any arbitrary one of these flaps or to these flaps as a group, the reference number 104 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise.

Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or position of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

In some circumstances, a flap that is being retracted can impact a spoiler that is deployed in the droop configuration. For example, if an actuator of the spoiler experiences a fault, the retracting flap can come into contact with a trailing edge of the spoiler. This scenario is referred to as a "backdrive" condition. Spoiler and flap systems are designed to withstand backdrive conditions; however, some design features of the spoiler and flap system to account for backdrive conditions can add significant weight to the aircraft. For example, a flap actuator can be oversized to ensure that the flap actuator is able to move the flap into a non-deployed position even if the spoiler experiences a fault while in the droop configuration. To account for this circumstance, the flap actuator has to be more robust (and therefore heavier) than a flap actuator that is not sized to account for a backdrive condition. As another example, the trailing edge of the spoiler can be reinforced or strengthened (which adds weight) to withstand forces applied by the flap when the flap retracts in a backdrive condition. Even with such reinforcement, the trailing edge of the spoiler can be damaged by retraction of the flap, requiring replacement before subsequent flights, decreasing availability of the aircraft, and increasing the cost for the aircraft operator.

The present disclosure describes an aircraft spoiler mechanism that includes a releasable portion. The releasable portion includes the trailing edge of the spoiler. The releasable portion is coupled to the rest of the spoiler (including a forward portion of the spoiler) via a hinge and retainer assembly. When a retainer of the hinge and retainer assembly is disengaged, a hinge of the hinge and retainer assembly enables the releasable portion to rotate upward responsive to force applied by a flap during a backdrive condition. The retainer is configured to disengage responsive to a force that should not (based on material properties of the releasable portion) damage the trailing edge of the spoiler. Accordingly, the hinge and retainer assembly allows the flap to be retracted in a backdrive condition without damaging the spoiler.

Further, because the trailing edge of the spoiler does not have to endure the entire force of retracting the flap, a less reinforced spoiler trailing edge can be used. Reducing reinforcement of the spoiler trailing edge reduces the weight of the spoiler system. Additionally, when the retainer is released and the releasable portion of the spoiler is out of the way, the retracting flap can press on a relatively flat portion of the spoiler (as opposed to the relatively sharp trailing edge of the spoiler). Pressing on the relatively flat portion of the spoiler distributes the loads on the flap and spoiler system more evenly, reducing the need for reinforcement.

The retainer can be configured to be manually resettable on the ground to restore the spoiler to normal operation without the need to replace the spoiler due to trailing edge damage. Thus, the cost and time associated with maintaining the spoiler system is decreased.

FIG. 1 is a diagram that illustrates an example of an aircraft 100 and details of a spoiler mechanism 106 of the aircraft 100 according to a particular implementation. The aircraft 100 includes wings 101 (including a port wing 101A and a starboard wing 101B), and each wing 101 includes one or more flaps 104. In FIG. 1, a spoiler mechanism 106 is positioned adjacent to (e.g., forward of) each flap 104. For example, a port-side spoiler mechanism 106A is adjacent to a port-side flap 104A, and a starboard-side spoiler mechanism 106B is adjacent to a starboard-side flap 104B. FIG. 1 also illustrates a bulk airflow direction 116 relative to the aircraft 100.

FIG. 1 also illustrates details of a spoiler mechanism 106 in relation to a flap 104. The spoiler mechanism 106 is coupled to a wing structure 102, such as a structural member of one of the wings 101. The spoiler mechanism 106 includes multiple segments, including a spoiler fore-section 108 and a spoiler aft-section 110. Rotation of the spoiler fore-section 108 and the spoiler aft-section 110 in a first rotational direction 112 from a neutral position (which is illustrated in FIG. 1) extends the spoiler fore-section 108 and the spoiler aft-section 110 into bulk airflow over the wing 101 to reduce lift generated by the wing 101. Rotation of the spoiler fore-section 108 and the spoiler aft-section 110 in a second rotational direction 114 from the neutral position extends the spoiler fore-section 108 and the spoiler aft-section 110 toward the flap 104. For example, when the flap 104 is in a deployed position relative to the wing structure 102 (e.g., as illustrated in FIG. 3B), the spoiler mechanism 106 can be deployed in a droop configuration.

The spoiler fore-section 106 has a forward end 120 and a hinge end 122. The forward end 120 of the spoiler fore-section 108 includes a pivot coupling 126 to couple the forward end 120 to the wing structure 102. The pivot coupling 126 enables rotation of the spoiler fore-section 108 relative to the wing structure 102. The forward end 120 of the spoiler fore-section 106 also includes an actuator coupling 124. The actuator coupling 124 is configured to couple to an actuator 118. The actuator 118 is coupled to the actuator coupling 124 and to the wing structure 102.

The spoiler fore-section 108 and the spoiler aft-section 110 are rotatable in the first rotational direction 112 from the neutral position responsive to extension of the actuator 118 and are rotatable in the second rotational direction 114 (opposite the first rotational direction 112) from the neutral position responsive to retraction of the actuator 118. For example, in FIG. 1, extension of the actuator 118 causes rotation of the spoiler fore-section 108 about the pivot coupling 126 in the first rotational direction 112 (e.g., an upward direction in the example illustrated in FIG. 1) and retraction of the actuator 118 causes rotation of the spoiler fore-section 108 about the pivot coupling 126 in the second rotational direction 114 (e.g., a downward direction in the example illustrated in FIG. 1).

The spoiler aft-section 110 includes a forward end 130 and a trailing edge 132. The forward end 130 includes a hinge and retainer assembly 150. The hinge and retainer assembly 150 includes a second hinge coupling 134 configured to pivotally couple to a first hinge coupling 136 of the spoiler fore-section 108. In the example illustrated in FIG. 1, the second hinge coupling 134 is proximate to an upper surface 154 of the spoiler aft-section 110 and the first hinge coupling 136 is proximate to an upper surface 152 of the spoiler fore-section 108.

The hinge and retainer assembly 150 also includes a retainer, which in FIG. 1 corresponds to a first retainer portion 144 of the spoiler fore-section 108 and a second retainer portion 148 of the spoiler aft-section 110. In the example illustrated in FIG. 1, the first retainer portion 144 includes a retainer catch, and the second retainer portion 148 includes a resilient retainer clip. The first retainer portion 144 and the second retainer portion 148 are configured to engage one another (as illustrated in FIG. 1) when the spoiler aft-section 110 is aligned with the spoiler fore-section 108. The first retainer portion 144 and the second retainer portion 148 are configured to disengage from one another responsive to the spoiler aft-section 110 pivoting upward relative to the spoiler fore-section 108 (as illustrated in FIGS. 4B-4D).

In some implementations, the retainer or the hinge and retainer assembly 150 can be formed of a different material than the spoiler fore-section 108, the spoiler aft-section 110, or both. For example, the spoiler fore-section 108 can include a composite material 142 (e.g., a light-weight stiffening core with surface skins, a fiber-reinforced polymer, etc.), and the first retainer portion 144 can include a metal fitting coupled to the composite material 142 of the spoiler fore-section 108 using an adhesive and/or one or more fasteners. As another example, the spoiler aft-section 110 can include a composite material 146 (e.g., a light-weight stiffening core with surface skins, a fiber-reinforced polymer, etc.), and the second retainer portion 148 can include a metal fitting (e.g. a metal tab) coupled to the composite material 146 of the spoiler aft-section 110 using an adhesive and/or one or more fasteners. Using metal for the retainer may improve wear characteristics of the hinge and retainer assembly 150. Additionally, it can be difficult and time consuming to machine some composite materials into complex shapes to form the first and second retainer portions 144, 148; therefore, forming the retainer of metal can reduce manufacturing time and expense. The specific arrangement of metal and composite materials illustrated in FIG. 1 is just one example. Other arrangements are also envisioned, such as forming the second hinge coupling 134 of metal, forming the first retainer portion 144 of a composite material and the second retainer portion 148 of metal, etc.

The first hinge coupling 136, the first retainer portion 144, the second hinge coupling 134, and the second retainer portion 148 are positioned such that a force applied to the spoiler aft-section 110 by bulk airflow over the wing structure 102 during operation of the aircraft 100 tends to reinforce engagement of the first retainer portion 144 and the second retainer portion 148 with one another. For example, the retainer is positioned closer to the flap 104 than the hinge couplings 134, 136 are. To illustrate, the first retainer portion 144 is disposed proximate to a lower surface 156 of the spoiler fore-section 108, and the first hinge coupling 136 is disposed proximate to an upper surface 152 of the spoiler fore-section 108. Additionally, the second retainer portion 148 is disposed proximate to a lower surface 158 of the spoiler aft-section 110, and the second hinge coupling 134 is disposed proximate to an upper surface 154 of the spoiler aft-section 110. In this arrangement, a downward force on the spoiler aft-section 110 tends to move the second retainer portion 148 toward the first retainer portion 144, thereby reinforcing engagement of the first and second retainer portions 144, 148 with one another.

The positioning of the first hinge coupling 136, the first retainer portion 144, the second hinge coupling 134, and the second retainer portion 148 is also arranged such that a force applied to the spoiler aft-section 110 in a disengagement direction (e.g., upward at the trailing edge 132 in FIG. 1) tends to disengage the first retainer portion 144 and the second retainer portion 148. For example, the second retainer portion 148 may include a resilient retainer clip having a protrusion on an end portion of an elongate arm, which is configured to deflect such that the protrusion will disengage with the first retainer portion 144 that may comprise a retainer clip conforming to the protrusion. The first retainer portion 144 and the second retainer portion 148 interact with a retention force that is configured to release due to application of at least a threshold force in the disengagement direction. The magnitude of the threshold force is established (e.g. set during design) based on the dimensions and materials of the first and second retainer portions 144, 148. For example, the second retainer portion 148 may be configured to have an elongate arm with a length that is a function of its thickness, such as a ratio of elongate arm length being at least three times the minimum thickness of the elongate arm length, for example, which enables the second retainer portion 148 to resiliently deflect in response to the force applied to the spoiler-aft section. In particular implementations, the magnitude of the threshold force is set such that the first retainer portion 144 and the second retainer portion 148 disengage from one another responsive to a force that exceeds the threshold force but is insufficient to cause an overpressure valve 160 of the actuator 118 to release. Additionally, or in the alternative, the threshold force is set such that the first retainer portion 144 and the second retainer portion 148 disengage from one another responsive to a force that exceeds the threshold force but is insufficient to cause significant (e.g., detectable or irreparable) damage to the trailing edge 132 if the force is applied to the trailing edge 132.

Costly repairs can be avoided by configuring the retainer to release before significant damage is done to the spoiler aft-section 110. For example, after a backdrive condition, the spoiler mechanism can be reset by resetting the actuator 118 (e.g., resetting the overpressure valve 160) and resetting the hinge and retainer assembly 150. In some implementations, the hinge and retainer assembly 150 can be reset manually by applying a downward force to the spoiler aft-section 110 to reengage the first and second retainer portions 144, 148.

Figure 2A:
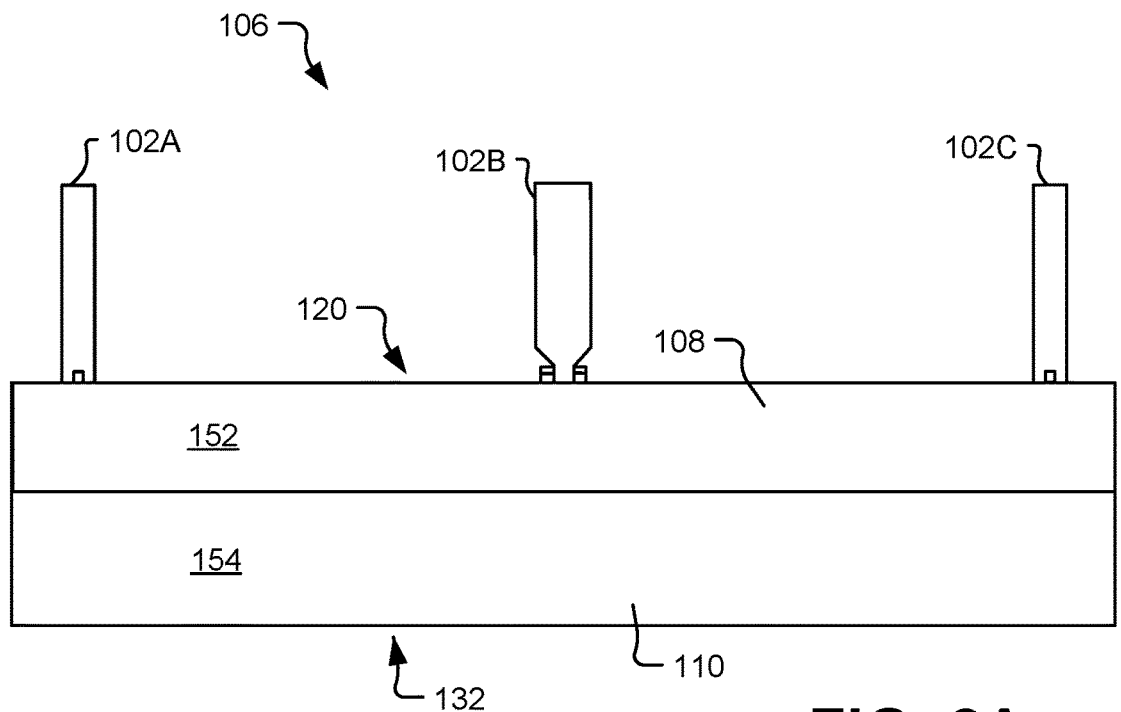
FIG. 2A is a diagram that illustrates an example of a top view of the spoiler mechanism of FIG. 1.
Figure 2B:
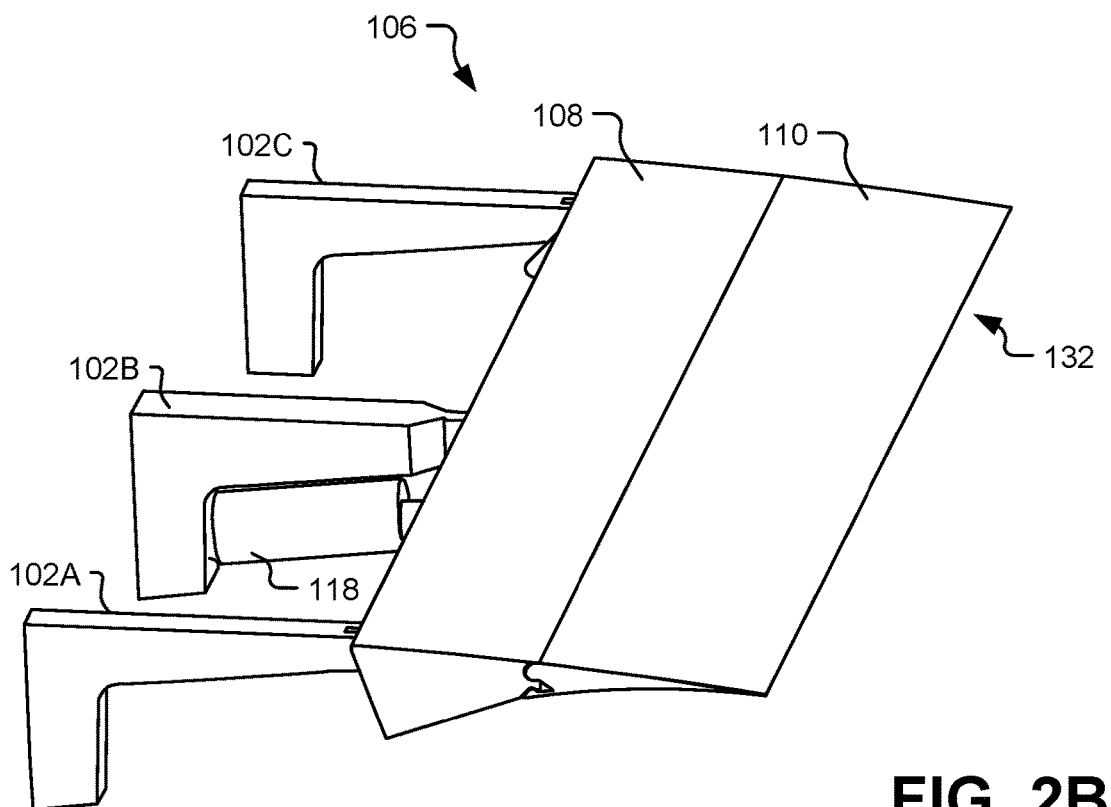
FIG. 2B is a diagram that illustrates an example of a perspective side view of the spoiler mechanism of FIG. 1.

FIG. 2A is a diagram that illustrates an example of a top view of the spoiler mechanism 106 of FIG. 1, and FIG. 2B is a diagram that illustrates an example of a perspective side view of the spoiler mechanism 106 of FIG. 1. In FIGS. 2A and 2B, the spoiler mechanism 106 is coupled to three wing structures, including a first wing structure 102A, a second wing structure 102B, and a third wing structure 102C. In this example, the actuator 118 is coupled to the spoiler fore-section 108 and to the second wing structure 102B. In other examples, the actuator 118 can be coupled to the first wing structure 102A or the third wing structure 102C. In yet other examples, the spoiler mechanism 106 can include more than one actuator 118, in which case the actuators 118 can be coupled to more than one of the wing structures 102.

Figure 3A:
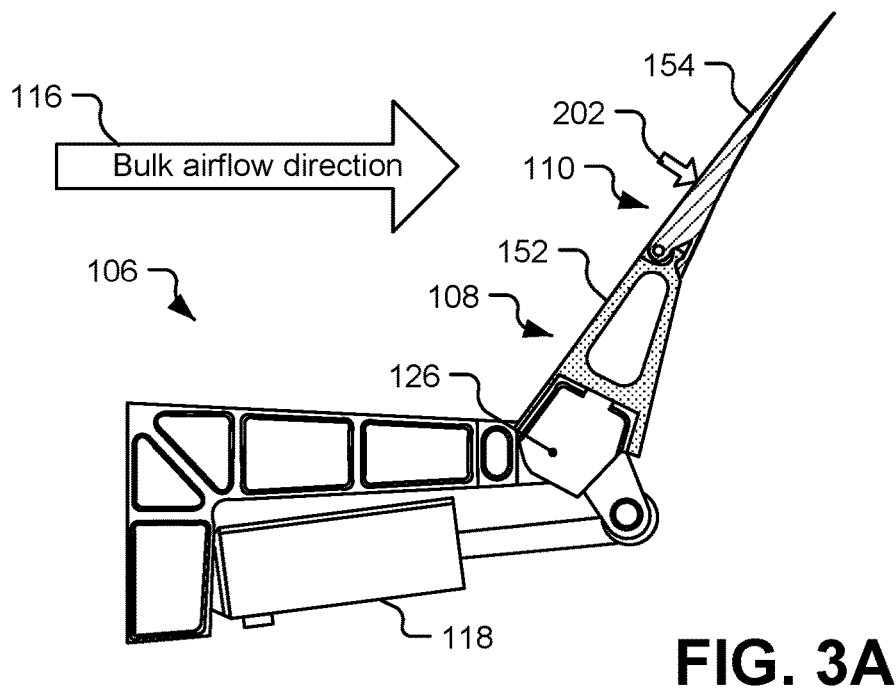
FIG. 3A is a diagram that illustrates an example of the spoiler mechanism of FIG. 1 deployed in an upward direction.
Figure 3B:
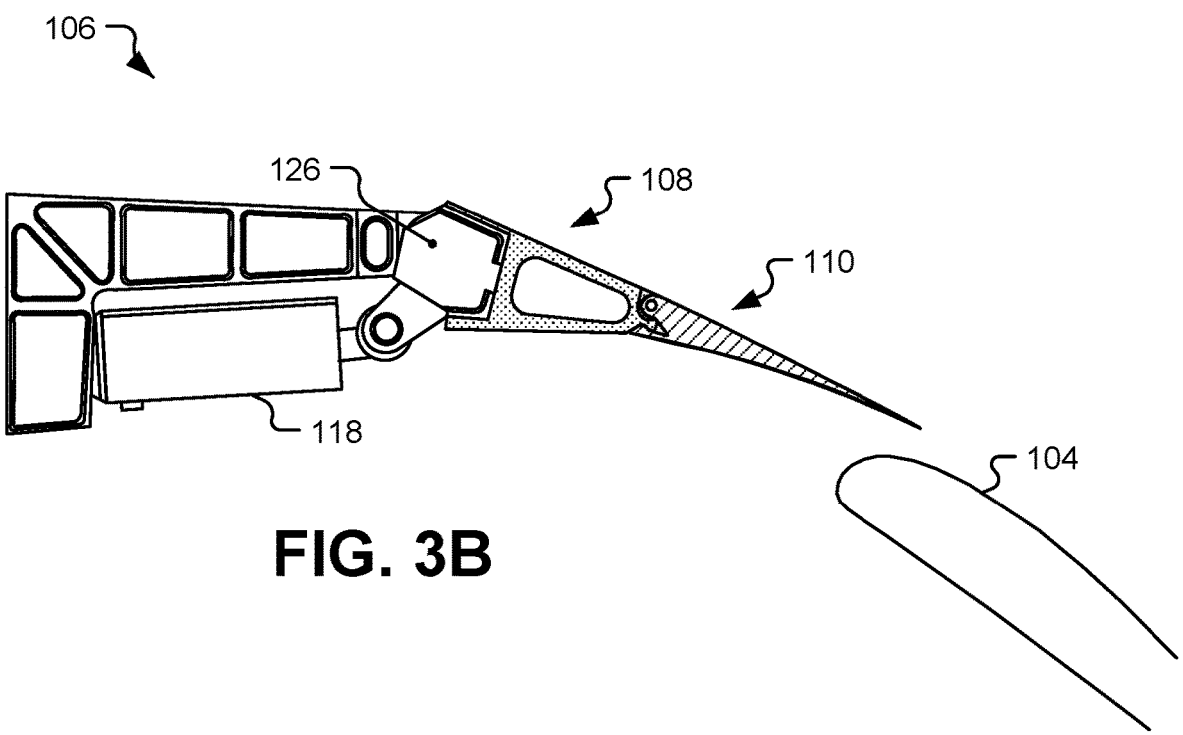
FIG. 3B is a diagram that illustrates an example of the spoiler mechanism of FIG. 1 deployed in a downward direction.

FIGS. 3A and 3B are diagrams that illustrate examples of deployed positions of the spoiler mechanism 106 of FIG. 1. FIG. 3A illustrates an example of the spoiler mechanism 106 deployed in an upward direction (also referred to as a lift dump configuration). As compared to the neutral position illustrated in FIG. 1, in FIG. 3A, the actuator 118 is extended, and the spoiler fore-section 108 and spoiler aft-section 110 are rotated in a counter-clockwise rotational direction around the pivot coupling 126. As a result, the upper surface 152 of the spoiler fore-section 108 and the upper surface 154 of the spoiler aft-section 110 are subjected to a force 202 due to airflow in the bulk airflow direction 116 over the wing structure 102. The force 202 tends to reinforce engagement of the first and second retainer portions 144, 148 (shown in FIG. 1).

FIG. 3B illustrates an example of the spoiler mechanism 106 deployed in a downward direction (also referred to as a droop configuration). As compared to the neutral position illustrated of FIG. 1, in FIG. 3B, the actuator 118 is retracted, and the spoiler fore-section 108 and spoiler aft-section 110 are rotated in a clockwise rotational direction around the pivot coupling 126. As a result, the upper surface 152 of the spoiler fore-section 108 and the upper surface 154 of the spoiler aft-section 110 provide a relatively smooth camber to improve airflow characteristics over the wing 101.

FIGS. 4A, 4B, 4C, and 4D are diagrams that illustrate examples of stages of operation of the spoiler mechanism 106 and the flap 104 of FIG. 1 in a backdrive condition. The backdrive condition occurs when a retracting flap contacts a spoiler that is deployed in the droop configuration. For example, the backdrive condition can occur as a result of the actuator 118 of the spoiler mechanism 106 experiencing a fault.

Figure 4A:
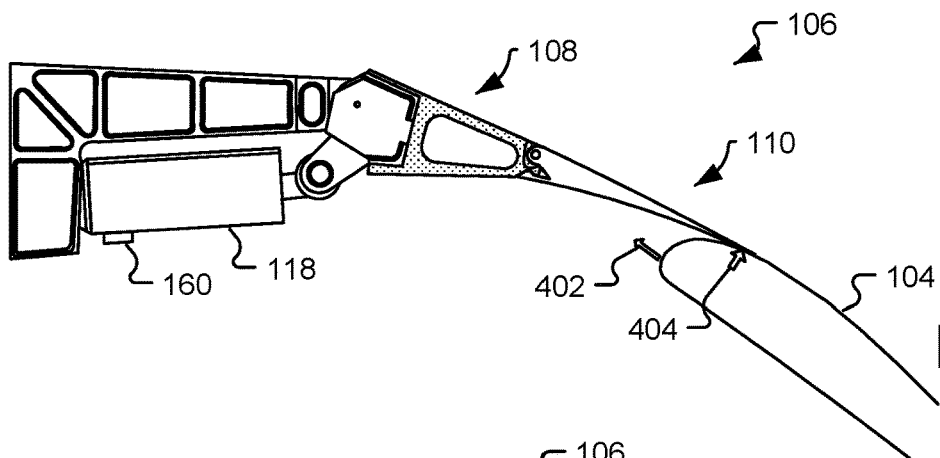
FIGS. 4A, 4B, 4C, and 4D are diagrams that illustrate examples of stages of operation of the spoiler mechanism and flap of FIG. 1 in a backdrive condition.
Figure 4B:
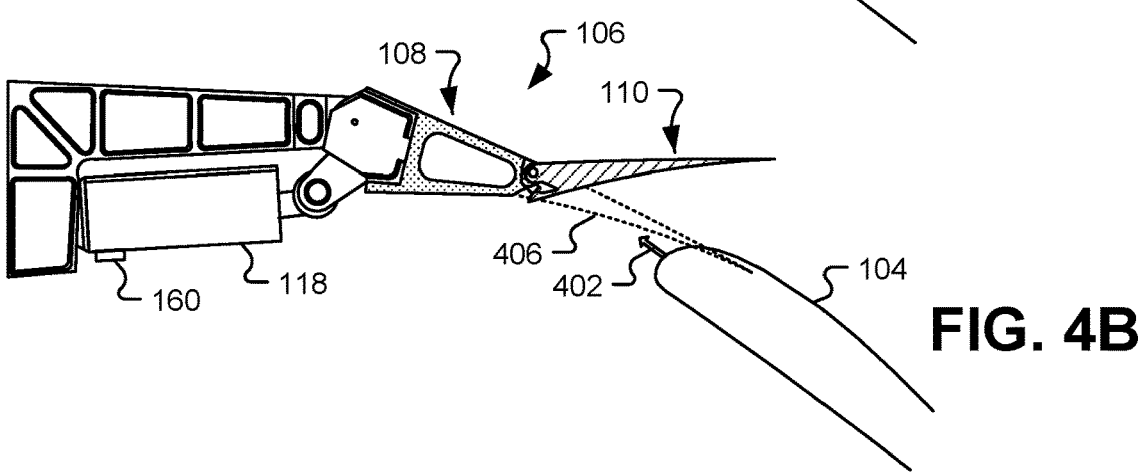
Figure 4C:
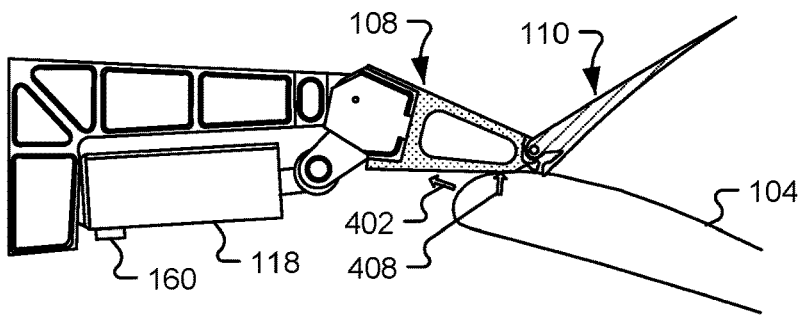
Figure 4D:
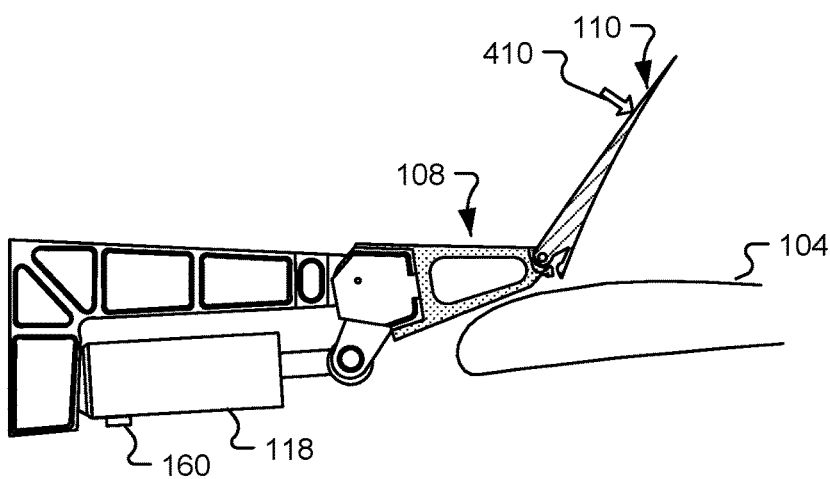

FIG. 4A illustrates a first stage of the backdrive condition. In FIG. 4A, the flap 104 is moving in a direction 402 as the flap retracts from a deployed state (e.g., as illustrated in FIG. 3B) toward a non-deployed state (e.g., as illustrated in FIG. 1). At the first stage illustrated in FIG. 4A, the flap 104 has contacted the spoiler mechanism 106 near the trailing edge 132 of the spoiler aft-section 110. Due to the contact between the flap 104 and the spoiler mechanism 106 and due to the flap's continued movement in the direction 402, the flap 104 exerts a force 404 on the spoiler aft-section 110. At the first stage illustrated in FIG. 4A, the force 404 is less than the threshold force to disengage the first and second retainer portions 144, 148.

FIG. 4B illustrates a second stage of the backdrive condition. In the second stage, the force 404 of FIG. 4A has exceeded the threshold force, and as a result, the first retainer portion 144 and the second retainer portion 148 have disengaged. Disengaging the first and second retainer portions 144, 148 allows the spoiler aft-section 110 to rotate relative to the spoiler fore-section 108. For example, FIG. 4B illustrates an aligned position 406 showing a position of the spoiler aft-section 110 if the spoiler aft-section 110 and the spoiler fore-section 108 were aligned and the first and second retainer portions 144, 148 were engaged. In contrast to the aligned position 406, the spoiler aft-section 110 in FIG. 4B is rotated around the hinge (e.g., relative rotation between the first hinge coupling 136 and the second hinge coupling 134). FIG. 4B also illustrates that the flap 104 continues to retract in the direction 402. In FIG. 4B, the rotation of the spoiler aft-section 110 is not necessarily to scale. For example, in some implementations, the spoiler aft-section 110 remains in sliding contact with the flap 104 as the flap 104 retracts.

FIG. 4C illustrates a third stage of the backdrive condition. In the third stage, the flap 104 has continued to move in the direction 402 and has contacted the spoiler fore-section 108. Due to the contact between the flap 104 and the spoiler mechanism 106 and due to the flap's continued movement in the direction 402, the flap 104 exerts a force 408 on the spoiler fore-section 108. The force 408 is sufficient to overcome the overpressure valve 160 of the actuator 118 so that the flap 104 is able to push the spoiler mechanism 106 upward and to extend the actuator 118.

As best seen in FIG. 4C, the first retainer portion 144 is spaced apart from the lower surface 156 of the spoiler fore-section 108 such that the flap 104 is not able to contact the first retainer portion 144. Thus, the flap 104 applies the force 408 to the spoiler fore-section 108 without direct contact between the flap 104 and the first retainer portion 144. The lack of direct contact between the flap 104 and the first retainer portion 144 protects both components from damage.

FIG. 4D illustrates a fourth stage of the backdrive condition. In the fourth stage, the flap 104 is fully retracted and has forced the spoiler mechanism 106 substantially back to the neutral position illustrated in FIG. 1 except that the spoiler aft-section 110 remains rotated relative to the spoiler fore-section 108. As explained above, the amount of rotation illustrated is not necessarily to scale.

In FIG. 4D, a force 410 in the downward direction can be applied (e.g., by hand) to reengage the first and second retainer portions 144, 148 to prepare the spoiler mechanism 106 for a subsequent flight. In some implementations, other activities may also be associated with preparing the spoiler mechanism 106 for another flight, such as inspecting, testing, or replacing the actuator 118, inspecting or testing the spoiler mechanism 106, inspecting or testing the flap 104, etc. In a particular implementation, the threshold force to disengage the first and second retainer portions 144, 148 is configured to cause the spoiler aft-section 110 to rotate out of the way of the retracting flap 104 without the flap 104 or the spoiler aft-section 110 incurring substantial damage (e.g., damage that would merit replacement of either component).

Figure 5:
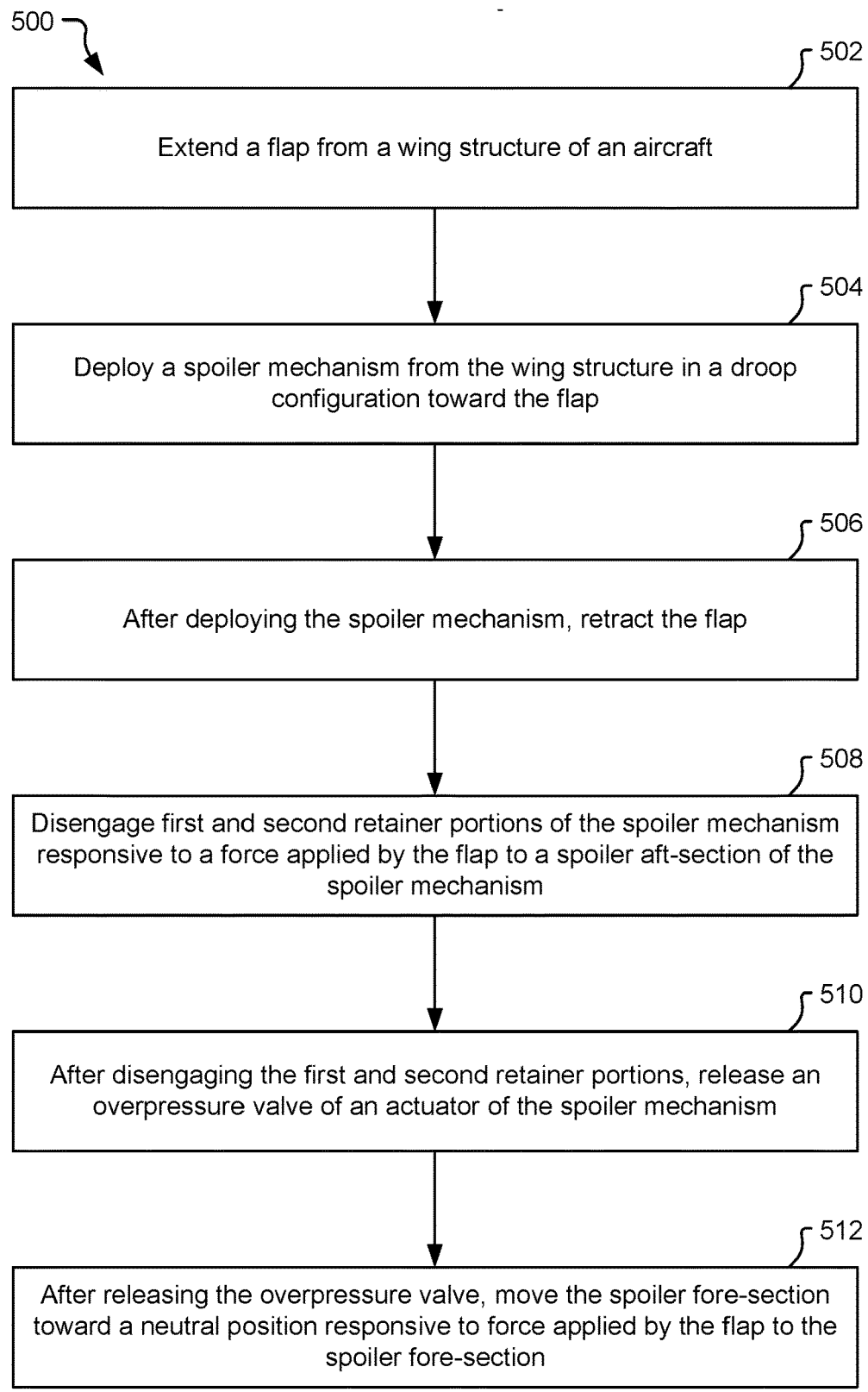
FIG. 5 is a flow chart of an example of a method of controlling the spoiler mechanism of FIG. 1.

FIG. 5 is a flow chart of an example of a method 500 of controlling a spoiler of an aircraft, such as the aircraft 100. The method 500 can be performed by the spoiler mechanism 106 or by another spoiler mechanism that includes a spoiler fore-section and a spoiler aft-section coupled via a hinge and retainer assembly with a releasable retainer.

The method 500 includes, at 502, extending a flap from a wing structure of an aircraft. For example, as illustrated in FIG. 3B, the flap 104 can extend to a deployed position relative to the wing structure 102, e.g., to increase lift generated by the wing structure 102.

The method 500 also includes, at 504, deploying a spoiler mechanism from the wing structure in a droop configuration toward the flap. For example, as illustrated in FIG. 3B, the spoiler mechanism 106 can be rotated downward toward the flap 104 to improve airflow characteristics over the wing structure 102 while the flap 104 is deployed.

The method 500 further includes, at 506, after deploying the spoiler mechanism, retracting the flap. For example, the flap 104 can be retracted when the need for additional lift has passed.

In some circumstances, a backdrive condition can occur during retraction of the flap 104, such as when the actuator 118 of the spoiler mechanism 106 experiences a fault. In such circumstances, the method 500 further includes, at 508, disengaging the first retainer portion and the second retainer portion responsive to a force applied by the flap to the spoiler aft-section. For example, as illustrated in FIG. 4A, the flap 104 can apply the force 404 to the spoiler aft-section 110 as a result of the backdrive condition. In this circumstance, the first and second retainer portions 144, 148 can disengage to allow the spoiler aft-section 110 to rotate upward relative to the spoiler fore-section 108, as illustrated in FIG. 4B.

The method 500 further includes, at 510, after disengaging the first retainer portion and the second retainer portion, releasing an overpressure valve of an actuator of the spoiler mechanism. For example, as explained with reference to FIGS. 4A-4D, the threshold force to disengage the first and second retainer portions 144, 148 can be set such that the first and second retainer portions 144, 148 disengage without releasing the overpressure valve 160 (e.g., the threshold force is less than the force required to release the overpressure valve 160). Thus, at the second stage of the backdrive condition illustrated in FIG. 4B, the overpressure valve 160 has not been released. Subsequently, however, as the flap 104 continues to retract, the flap 104 can contact the spoiler fore-section 108 and apply the force 408 to the spoiler fore-section 108. The spoiler fore-section 108 is not able to move away from the flap 104 as the spoiler aft-section 110 did, so the force 408 continues to build until it is sufficient to release the overpressure valve 160 of the actuator 118.

The method 500 further includes, at 512, after releasing the overpressure valve, moving the spoiler fore-section toward a neutral position responsive to a force applied by the flap to the spoiler fore-section. For example, releasing the overpressure valve 160 enables the actuator 118 to extend. Thus, with the overpressure valve 160 released, the spoiler fore-section 108 is able to move upward, toward the neutral position, responsive to the force 408 applied by the flap 104.

Figure 6:
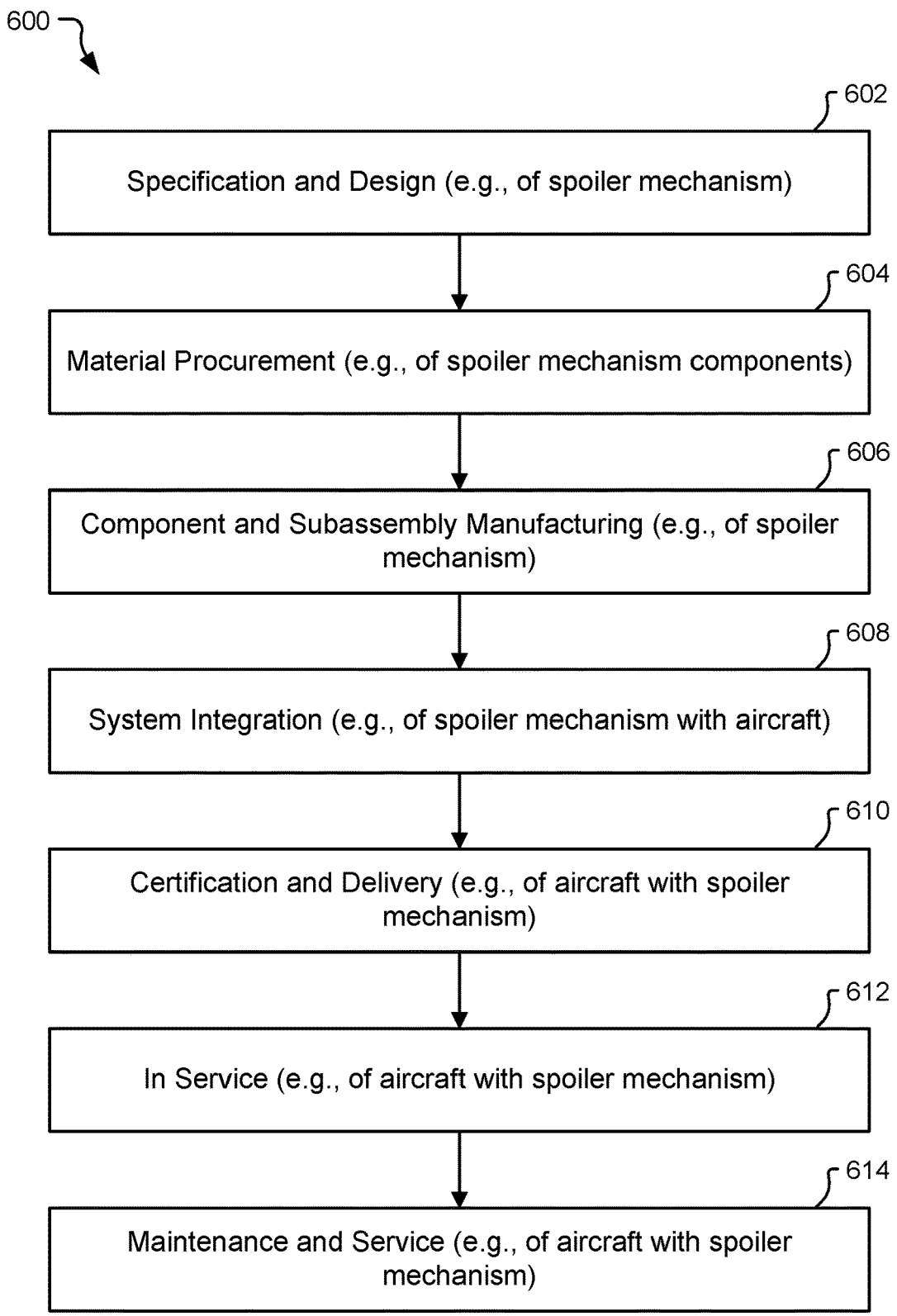
FIG. 6 is a flow chart of an example of a method associated with a life cycle of the aircraft of FIG. 1.

FIG. 6 is a flow chart of an example of a method 600 associated with a life cycle of the aircraft 100 of FIG. 1. During the life cycle of the aircraft 100, the spoiler mechanism 106 can be added to the aircraft 100 (e.g., via retrofit or upgrade) or the aircraft 100 can be designed and built initially with the spoiler mechanism 106. In FIG. 6, during pre-production, the method 600 includes, at 602, specification and design of the aircraft 100. During the specification and design of the aircraft 100, the method 600 can include specifying the spoiler mechanism 106 or components of the spoiler mechanism 106. At 604, the method 600 includes material procurement. For example, the method 600 can include procuring materials for the spoiler mechanism 106 (such as materials for the spoiler fore-section 108, the spoiler aft-section 110, the first retainer portion 144, the second retainer portion 148, the hinge couplings 134, 136, etc.).

During production, the method 600 includes, at 606, component and subassembly manufacturing and, at 608, system integration of the aircraft 100. In a particular implementation, the component and subassembly manufacturing, at 606, includes manufacturing the spoiler mechanism 106 or components of the spoiler mechanism 106. Likewise, the system integration, at 608, includes coupling the spoiler mechanism 106 or components of the spoiler mechanism 106 to other components and controllers of the aircraft 100.

At 610, the method 600 includes certification and delivery of the aircraft 100 and, at 612, placing the aircraft 100 in service. In some implementations, certification and delivery includes certifying the spoiler mechanism 106 or a spoiler/flap assembly that includes the spoiler mechanism 106. Placing the vehicle in service can also include placing the spoiler mechanism 106 in service. While in service by a customer, the aircraft 100 may be scheduled for routine maintenance and service (which can also include modification, reconfiguration, refurbishment, and so on). At 614, the method 600 includes performing maintenance and service on the aircraft 100. In a particular implementation, the method 600 includes performing maintenance and service on the spoiler mechanism 106. For example, the maintenance and service of the spoiler mechanism 106 can include manually reengaging the first and second retainer portions 144, 148 after a backdrive condition.

Each of the processes of the method 600 is performed or carried out by a system integrator, a third party, and/or an operator (e.g., a customer). For the purposes of this description, a system integrator includes without limitation any number of vehicle manufacturers and major-system subcontractors; a third party includes without limitation any number of venders, subcontractors, and suppliers; and an operator is an airline, leasing company, military entity, service organization, and so on.

FIG. 7 is a block diagram of a particular example of the aircraft 100 and the spoiler mechanism 106 of FIG. 1. In a particular implementation, the aircraft 100 is produced by at least a portion of the method 600 of FIG. 6. As shown in FIG. 7, the aircraft 100 includes an airframe 718 with a plurality of systems 720 and an interior 722. Examples of the plurality of systems 720 include one or more of a propulsion system 724, an electrical system 726, an environmental system 728, a hydraulic system 730, a spoiler mechanism 106, and one or more flaps 104. The spoiler mechanism 106 includes the actuator 118, the spoiler fore-section 108 with the first retainer portion 144, and the spoiler aft-section 110 with the second retainer portion 148. The aircraft 100 can also include other systems that are not shown.

Apparatus and methods described herein can be employed during any one or more of the stages of the method 600 of FIG. 6. For example, components or subassemblies corresponding to production process 608 can be fabricated or manufactured in a manner similar to components or subassemblies produced while the aircraft 100 is in service, at 612 for example and without limitation. Also, one or more apparatus implementations, method implementations, or a combination thereof can be utilized during the production stages (e.g., stages 602-610 of the method 600), for example, by substantially expediting assembly of or reducing the cost of the aircraft 100. Similarly, one or more of apparatus implementations, method implementations, or a combination thereof can be utilized while the aircraft 100 is in service, at 612 for example and without limitation, to maintenance and service, at 614.

Although one or more of FIGS. 1-7 may illustrate systems, apparatuses, and/or methods according to the teachings of the disclosure, the disclosure is not limited to these illustrated systems, apparatuses, and/or methods. One or more functions or components of any of FIGS. 1-7 as illustrated or described herein may be combined with one or more other portions of another of FIGS. 1-7. Accordingly, no single implementation described herein should be construed as limiting and implementations of the disclosure may be suitably combined without departing form the teachings of the disclosure. As an example, one or more operations described with reference to FIGS. 5-6 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A spoiler mechanism for an aircraft, the spoiler mechanism comprising:
   a spoiler fore-section including a forward end configured to couple to a wing structure of an aircraft and including a hinge end, the hinge end including a first hinge coupling and a first retainer portion; and
   a spoiler aft-section including a second retainer portion and a second hinge coupling coupled to the first hinge coupling of the spoiler fore-section, wherein the first retainer portion and the second retainer portion are configured to engage one another when the spoiler aft-section is aligned with the spoiler fore-section, and the first retainer portion and the second retainer portion are configured to disengage from one another responsive to the spoiler aft-section pivoting upward relative to the spoiler fore-section.

2. The spoiler mechanism of claim 1, wherein the first retainer portion includes a retainer catch and the second retainer portion includes a resilient retainer clip.

3. The spoiler mechanism of claim 1, wherein the first retainer portion is disposed proximate a lower surface of the spoiler fore-section and the first hinge coupling is disposed proximate an upper surface of the spoiler fore-section, and wherein the second retainer portion is disposed proximate a lower surface of the spoiler aft-section and the second hinge coupling is disposed proximate an upper surface of the spoiler aft-section.

4. The spoiler mechanism of claim 1, wherein the spoiler fore-section further comprises an actuator coupling and a pivot coupling, the actuator coupling configured to couple to an actuator and the pivot coupling configured to pivotally connect the spoiler fore-section to the wing structure, the actuator coupling and a pivot coupling arranged such that the spoiler fore-section and the spoiler aft-section are rotatable in a first rotational direction from a neutral position responsive to extension of the actuator and are rotatable in a second rotational direction from the neutral position responsive to retraction of the actuator.

5. The spoiler mechanism of claim 4, wherein, during operation of the aircraft, the rotation of the spoiler fore-section and the spoiler aft-section in the first rotational direction from the neutral position extends the spoiler fore-section and the spoiler aft-section into a bulk airflow to reduce lift generated by the wing structure.

6. The spoiler mechanism of claim 4, wherein the rotation of the spoiler fore-section and the spoiler aft-section in the second rotational direction from the neutral position extends the spoiler fore-section and the spoiler aft-section in a droop configuration toward a flap of the aircraft.

7. The spoiler mechanism of claim 1, wherein the first retainer portion and the second retainer portion, when disengaged, are resettable manually by application of a downward force on the spoiler aft-section.

8. The spoiler mechanism of claim 1, wherein the first hinge coupling, the first retainer portion, the second hinge coupling, and the second retainer portion are positioned such that a force applied to the spoiler aft-section by bulk airflow over the wing structure during operation tends to reinforce engagement of the first retainer portion and the second retainer portion with one another.

9. An aircraft comprising:
   a wing structure;
   a spoiler mechanism including:
      a spoiler fore-section including a forward end coupled to the wing structure and including a hinge end, the hinge end including a first hinge coupling and a first retainer portion; and
      a spoiler aft-section including a second retainer portion and a second hinge coupling coupled to the first hinge coupling of the spoiler fore-section, wherein the first retainer portion and the second retainer portion are configured to engage one another when the spoiler aft-section is aligned with the spoiler fore-section, and the first retainer portion and the second retainer portion are configured to disengage from one another responsive to the spoiler aft-section pivoting upward relative to the spoiler fore-section; and a flap coupled to the wing structure.

10. The aircraft of claim 9, wherein the first retainer portion includes a retainer catch and the second retainer portion includes a resilient retainer clip.

11. The aircraft of claim 9, wherein:
the first retainer portion is disposed proximate a first surface of the spoiler fore-section and the first hinge coupling is disposed proximate a second surface of the spoiler fore-section, the first surface of the spoiler fore-section closer to the flap than is the second surface of the spoiler fore-section, and the second retainer portion is disposed proximate a first surface of the spoiler aft-section and the second hinge coupling is disposed proximate a second surface of the spoiler aft-section, the first surface of the spoiler aft-section closer to the flap than is the second surface of the spoiler aft-section.

12. The aircraft of claim 9, wherein, during operation, rotation of the spoiler fore-section and the spoiler aft-section in a first rotational direction from a neutral position extends the spoiler fore-section and the spoiler aft-section into a bulk airflow to reduce lift generated by the wing structure.

13. The aircraft of claim 12, wherein rotation of the spoiler fore-section and the spoiler aft-section in a second rotational direction from the neutral position extends the spoiler fore-section and the spoiler aft-section in a droop configuration toward the flap.

14. The aircraft of claim 9, wherein the spoiler fore-section includes a composite material and the first retainer portion includes a metal fitting coupled to the composite material, and wherein the second retainer portion includes a metal tab.

15. The aircraft of claim 9, further comprising an actuator coupled to the wing structure and to the spoiler mechanism, the actuator configured to cause rotation of the spoiler fore-section and the spoiler aft-section, the actuator comprising an overpressure valve configured to release responsive to a first force applied to the actuator, and wherein the first retainer portion and the second retainer portion, when engaged, interact with a retention force configured to release due to application of a threshold force to the spoiler aft-section, wherein the threshold force is insufficient to cause release of the overpressure valve.

16. The aircraft of claim 9, wherein the first retainer portion is spaced apart from a lower surface of the spoiler fore-section such that, when the first retainer portion is disengaged from the second retainer portion by upward movement of the flap, the flap is not able to contact the first retainer portion.

17. A method of controlling a spoiler mechanism of an aircraft, the method comprising:
extending a flap from a wing structure of an aircraft;
deploying a spoiler mechanism from the wing structure in a droop configuration toward the flap, the spoiler mechanism including:
a spoiler fore-section including a forward end coupled to the wing structure and including a hinge end, the hinge end including a first hinge coupling and a first retainer portion; and
a spoiler aft-section including a second retainer portion and a second hinge coupling coupled to the first hinge coupling of the spoiler fore-section, wherein the first retainer portion and the second retainer portion are configured to engage one another when the spoiler aft-section is aligned with the spoiler fore-section, and the first retainer portion and the second retainer portion are configured to disengage from one another responsive to the spoiler aft-section pivoting relative to the spoiler fore-section;
after deploying the spoiler mechanism, retracting the flap; and
disengaging the first retainer portion and the second retainer portion responsive to a force applied by the flap to the spoiler aft-section.

18. The method of claim 17, wherein deploying the spoiler mechanism includes retracting an actuator coupled to the wing structure and to the spoiler fore-section.

19. The method of claim 17, further comprising:
after disengaging the first retainer portion and the second retainer portion, releasing an overpressure valve of an actuator of the spoiler mechanism; and
after releasing the overpressure valve, moving the spoiler fore-section toward a neutral position responsive to a force applied by the flap to the spoiler fore-section.

20. The method of claim 19, wherein the flap applies the force to the spoiler fore-section without direct contact between the flap and the first retainer portion.

* * * * *